United States Patent [19]

Raven et al.

[11] 4,435,728
[45] Mar. 6, 1984

[54] FIELD FREQUENCY-DOUBLING CIRCUIT FOR A TELEVISION SIGNAL

[75] Inventors: Johannes G. Raven; Marcellinus J. J. C. Annegarn, both of Eindhoven, Netherlands

[73] Assignee: U.S. Philips Corporation, New York, N.Y.

[21] Appl. No.: 340,545

[22] Filed: Jan. 18, 1982

[30] Foreign Application Priority Data

Feb. 9, 1981 [NL] Netherlands .................. 8100603

[51] Int. Cl.³ ............................................. H04N 5/02
[52] U.S. Cl. .................................................... 358/140
[58] Field of Search ................... 358/140, 21 R, 31

[56] References Cited

U.S. PATENT DOCUMENTS

| | | | |
|---|---|---|---|
| 3,830,971 | 8/1974 | van de Polder | 358/140 |
| 3,832,487 | 8/1974 | de Niet | 358/140 |
| 4,051,531 | 9/1977 | Baldwin | 358/140 |
| 4,276,565 | 6/1981 | Dalton | 358/140 |
| 4,322,750 | 3/1982 | Lord | 358/140 |

*Primary Examiner*—Michael A. Masinick
*Attorney, Agent, or Firm*—Thomas A. Briody; William J. Streeter; Edward W. Goodman

[57] ABSTRACT

A field-frequency doubling circuit for a television signal having two field memories (23, 29) may alternatively be employed as a picture memory for the television signal when it is slightly extended by providing a re-write circuit (9, 11) and an adapted output circuit (17, 47) (FIG. 1). This picture memory may be included in, for example, a noise suppression circuit or a movement detector.

6 Claims, 3 Drawing Figures

४,४३५,७२८

FIELD FREQUENCY-DOUBLING CIRCUIT FOR A TELEVISION SIGNAL

BACKGROUND OF THE INVENTION

The invention relates to a field-frequency doulbing circuit for a television signal having an input for the television signal whose field frequency must be doubled, a first and a second field memory, respectively, a change-over device switching at half the field frequency for writing information into the first and the second field memory, respectively, at a predetermined rate and reading the second and the first field memory, respectively, at a rate of substantially twice the write rate, and an output for the field frequency-doubled television signal.

Philips Research Reports 1960, pages 30–32 describes a field-frequency doubling circuit of the above-mentioned type. Such a circuit may be used for bandwidth compression in the television transmission channel or for reducing flicker phenomena in a television picture obtained by means of a television signal which is transmitted via a conventional broadcasting channel.

SUMMARY OF THE INVENTION

The invention has for its object to provide a wider range of applications of such a circuit.

According to the invention, a field-frequency doubling circuit of the type defined in the preamble is therefore characterized in that the change-over device comprises a portion for alternately applying a signal which has been delayed by two field periods to a picture memory output.

The measure in accordance with the invention makes the field-frequency doubling circuit also suitable for use as a picture memory circuit if it is provided with a low-cost extension.

In accordance with a further embodiment of the invention, such a field-frequency doubling circuit is also characterized in that it comprises a combining circuit coupled to the picture memory output and the input for combining an input signal with a signal which has been delayed for two field periods.

This makes it possible to obtain, for example, a movement detection circuit or noise suppression circuit by means of the combining circuit, while the field-frequency doubling function is maintained.

A still further embodiment in accordance with the invention is characterized in that an output of the combining circuit is coupled to an input of the changeover device for alternately writing an output signal of the combining circuit into the first and the second field memory, respectively.

As a result of this measure, a noise suppression may be obtained in the field-frequency doubled signal, provided the combining circuit is adapted to that function.

If a field-frequency doubling circuit in accordance with the invention is characterized in that coupled to an output at which the signal having double the field-frequency appears, this output being designated doubled-field-frequency output in the further course of this description, there is a change-over device switching at the field frequency for writing, during half a field period of the input signal of the field-frequency doubling circuit, the field-frequency-doubled signal into a third field memory and for writing, during a subsequent half field period its output signal into this third field memory, while coupled to an output of this field memory and the doubled-field-frequency output there is a change-over switch switching at half the field frequency from a doubled-picture-frequency output of which a picture-frequency-doubled signal may be obtained, then a picture frequency doubling can be effected, that is to say the two consecutive fields of an interlaced picture of the input signal always appear twice in the same sequence in the output signal.

DESCRIPTION OF THE DRAWINGS

The invention will now be further described by way of non-limitative example with reference to the accompanying drawings.

In the drawings.

DESCRIPTION OF THE PREFERRED EMBODIMENTS

Figure 1:
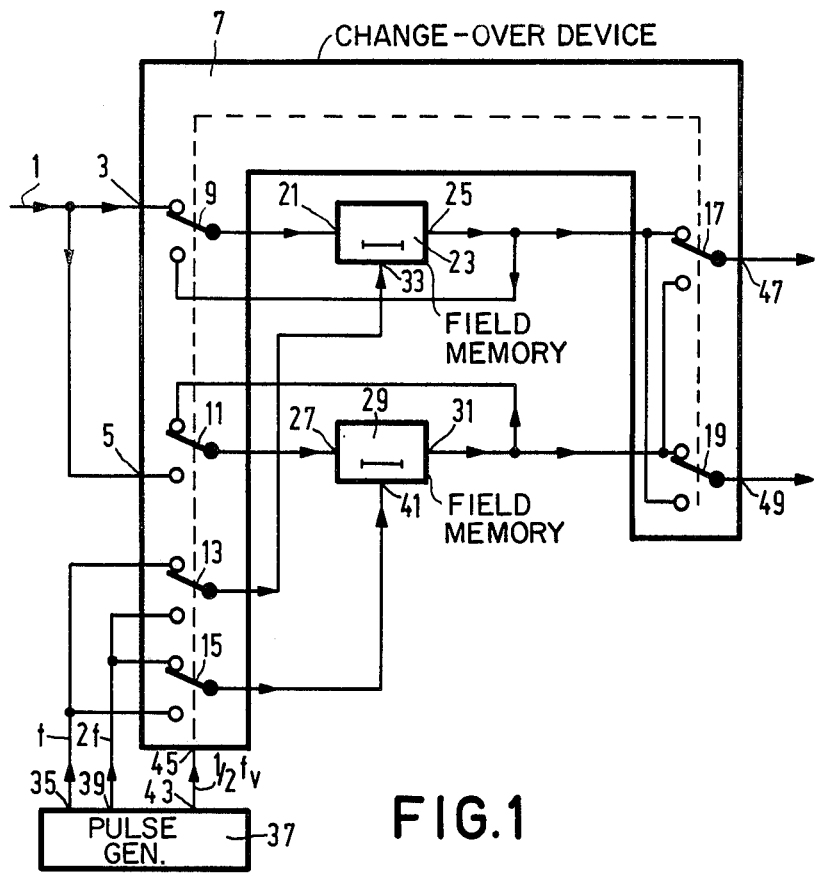
FIG. 1 illustrates, by means of a block schematic circuit diagram, a field-frequency doubling circuit in accordance with the invention.

In FIG. 1 a television signal to be converted is applied to an input 1. This television signal comprises picture information and synchronizing information. The synchronizing information is processed separately. The synchronizing signal processing will not be further described as known techniques may be employed for this purpose. The picture information of the television signal is assumed to be present in digital form, in view of the presently available field memories which are employed in this embodiment.

The input 1 is connected to an input 3 and an input 5 of a change-over device 7 switching at half the field frequency. The change-over device 7 comprises a number of change-over switches 9, 11, 13, 15, 17 and 19, which, during one field period, are of the signal at the input 1, are in the position shown in the drawing and during the other field period, are in the position not shown.

A master contact of the change-over switch 9 is connected to an input 21 of a first field memory 23, a contact of the change-over switch 9 being connected to an input 25 of the first field memory 23 and a further contact of the change-over switch 9 being connected to the input 3 of the change-over device 7.

A master contact of the change-over switch 11 is connected to an input 27 of a second field memory 29, a contact of the change-over switch 11 being connected to an output 31 of the second field memory 29 and a further contact of the change-over switch 11 being connected to the input 5 of the change-over device 7.

A master contact of the change-over switch 13 is connected to a clock signal input 33 of the first field memory 23, a contact of the change-over switch 13 being connected to an output 35 of a pulse generator 37 and a further contact of the change-over switch 13 being connected to an output 39 of the pulse generator 37.

A master contact of the change-over switch 15 is connected to a clock signal input 41 of the second field memory 29, a contact of the change-over switch 15 being connected to the output 39 and a further contact of the change-over switch 15 being connected to the output 35 of the pulse generator 37.

The pulse generator 37 produces a pulse signal having a write frequency f at its output 35, a pulse signal having a read frequency 2f, which is twice the write frequency at its output 39 and a switching signal, having a switching frequency which is half the field frequency $\frac{1}{2}f_v$ of the input signal, at an output 43, which output 43 is connected to a switching signal input 45 of the change-over device 7, as a result of which all of the change-over switches 9, 11, 13, 15, 17 and 19 of the change-over device 7 assume a different position field-sequentially.

A master contact of the change-over switch 17 is connected to a picture memory output 47 of the change-over device 7, a contact of the change-over switch 17 being connected to the output 25 of the first field memory 23 and a further contact of the change-over switch 17 being connected to the output 31 of the second field memory 29.

A master contact of the change-over switch 19 is connected to a field frequency-doubled output 49 of the field frequency doubling circuit, a contact of the change-over switch 19 being connected to the output 31 of the second field memory 29 and a further contact of the change-over switch 19 being connected to the output 25 of the first field memory 23.

In the position shown of the change-over device 7, a television signal is applied during a field period to the input 21 of the first field memory 23 via the input 3 and the change-over switch 9. This television signal is written into the first field memory 23 at a rate which is determined by the frequency f of the signal at the input 33 of the first field memory 23, which signal is obtained from the output 35 of the pulse generator 37 via the change-over switch 13. Simultaneously, a television signal is read at the same rate from the output 25 of the first field memory 23 and applied to the picture memory output 47 via the change-over switch 17. This read-out television signal is delayed by two field periods with respect to the signal at the input 3, which will be evident from the following description.

During this field period, a television signal which was written into the second field memory 41 during the preceding field period is read out via the output 31 and applied to the doubled field frequency output 49 via the change-over switch 19. Said reading action is done at a rate which is determined by the frequency 2f of the signal applied to the input 41 of the second field memory via the change-over switch 15. Consequently, this reading rate is twice the write rate of the first field memory, In addition, the read-out signal is again applied from the output 31 of the second field memory 29 to the input 27 via the change-over switch 11 and again written into the second field memory 29. This is performed twice in this field period, so that at the output 49 the television signal of the preceding field is released twice while at the end of the field period, the signal of said preceding field is again written into the second field memory 29.

In the subsequent field period the function of the two field memories 23 and 29 are interchanged, so that the first field memory 23 provides for the field frequency doubling and the second field memory 29 provides for the picture memory function. It will be obvious, that instead of serial memories, random access memories may alternatively be used whose write and read address generators are controlled in an adapted manner. When no coupling of the outputs to the inputs of the memories is required, the change-over switches 9, 11 may therefore be omitted.

Figure 2:
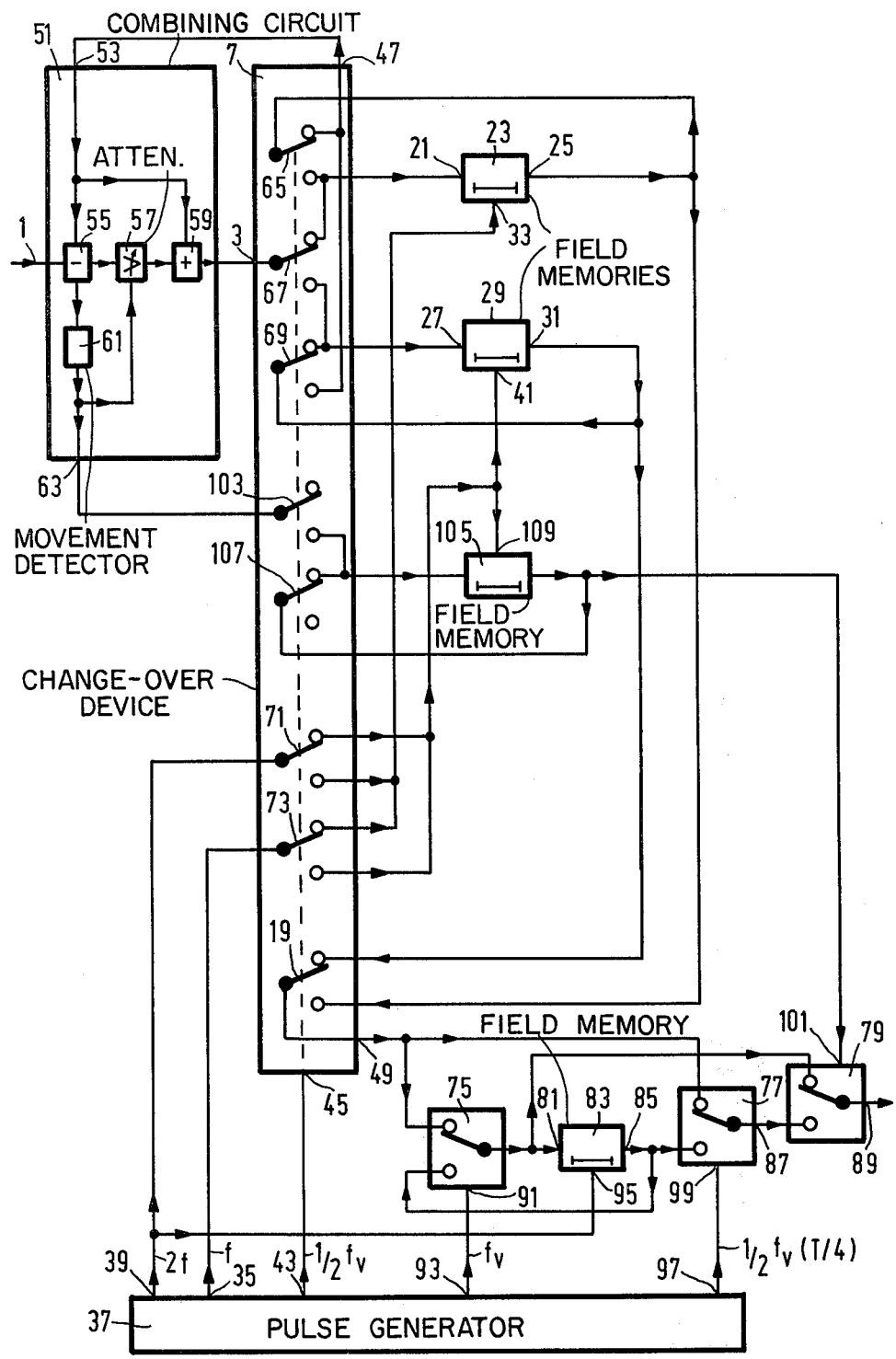
FIG. 2 illustrates, by means of a block schematic circuit diagram, a field-frequency doubling circuit in accordance with the invention, which is at the same time a noise suppression circuit and picture-frequency doubling circuit with an automatic change-over from field frequency-doubling to picture frequency-doubling.

In FIG. 2 corresponding components have been given the same reference numerals as in FIG. 1.

A combining circuit 51, which acts as a noise suppression circuit and an input of which is connected to the input 1 of the circuit and an output to the input 3 of the change-over device 7, is arranged between the input 1 of the circuit 51 and the input 3 of the change-over device 7. A further input 53 of said combining circuit is connected to the picture memory output 47 of the change-over device 7 and is supplied with a signal which has been delayed by two field periods, i.e. a picture period, with respect to the signal at the input 1. The two input signals are subtracted from each other in a subtracting circuit 55 and applied via an attenuator 57, having an adjustable attenuation, to an adder circuit 59 in which the signal at the input 53 is again added. A signal in which the noise has been reduced is then applied to the input 3 of the change-over device 7. The attenuation of the attenuator 57 is controlled by an output signal of a movement detector 61 which in this case receives its input signal from the subtracting circuit 5. If so desired, this movement detector 61 may of course be controlled in a manner different from the manner described here and may if so desired comprise filters to obtain the desired, properties, such as, for example, insensitivity to noise. In addition, the movement detector 61 applies a signal to an output 63 of the combining circuit 51.

The change-over device 7 is of a somewhat different construction than the device shown in FIG. 1. The functions of the change-over switches 9, 11 and 17 of FIG. 1 are now performed by three change-over swtiches 65, 67, 69, and the functions of change-over switches 13 and 15 of FIG. 1 are performed by two change-over switches 71, 73.

The doubled field frequency output 49 is connected to a contact each of change-over switches 75 and 77, respectively. The master contact of the change-over switch 75 is connected to an input 81 of a third field memory 83, an output 85 of which is connected to the other contact of the change-over switch 75. The master contact 87 of the change-over switch 77 is connected to a contact of a change-over switch 79 and the master contact 89 of the change-over switch 79 is the output of the circuit. The other contact of the change-over switch 79 is connected to the master contact of the change-over switch 75.

The change-over switch 75 is operated by a signal applied to its input 91 and obtained from an output 93 of the pulse generator 37, this signal having the frequency $f_v$ which is twice the frequency $\frac{1}{2}f_v$ which controls the change-over device 7.

The third field memory 83 has a clock signal input 95 to which the signal having the frequency 2f is applied which is received from the output 39 of the pulse generator 37. As a result thereof, this third field memory 83 operates as a delay line having a time delay of one field period of the signal of twice the field frequency, i.e. half the field period of the signal at the input 1 of the circuit.

The change-over switch 77 is operated by a signal $\frac{1}{2}f_v$ (T/4) having the same frequency as the signal operating change-over device 7 but shifted a quarter of a field period (T/4) which respect to that signal. This signal ½f_v (T/4) is obtained from an output 97 of the pulse generator 37 and applied to an input 99 of the change-over switch 77.

The change-over switch 79 is operated by a signal applied to its input 101 and received from the output 63 of the combining circuit 51.

In order to have this signal occur at the correct moment at the input 101 of the change-over switch 79, it is passed from the output 63 of the combining circuit 51 via a delay circuit, having a change-over switch 103, a field memory 105 and a change-over switch 107. This field memory 105 may be of a one-bit construction and is controlled by the same signal as the field memory 29. This signal is applied to an input 109 thereof.

The operation of the circuit of FIG. 2 will now be further described with reference to FIG. 3.

Figure 3:
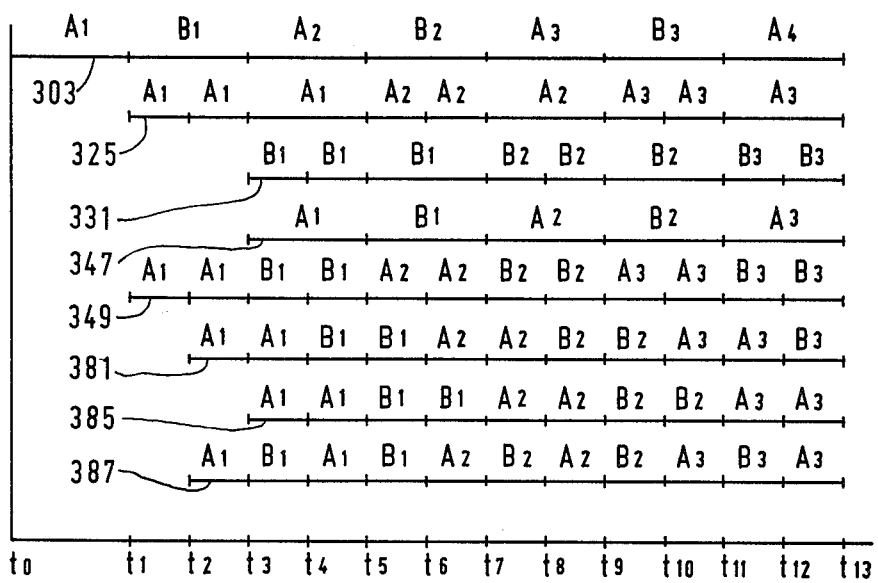
FIG. 3 shows the signals at various time periods for the circuit of FIG. 2.

FIG. 3 shows a number of time intervals $t_0-t_1$, $t_1-t_2$, $t_2-t_3$, $t_3-t_4$, $t_4-t_5$, $t_5-t_6$, $t_6-t_7$, $t_7-t_8$, $t_8-t_9$, $t_9-t_{10}$, $t_{10}-t_{11}$, $t_{11}-t_{12}$ and $t_{12}-t_{13}$ and a number of lines 303, 325, 331, 347, 349, 381, 385 and 387, respectively, along which the nature of the signals at the points 3 and 25, 31, 47, 49, 49, 81, 85, 87, respectively, of the circuit are indicated.

$A_1$ denotes a signal coming from a first field period of a first picture of the signal at the input 1 of the circuit, $B_1$ denotes a signal from the second field period of the first picture, $A_2$ denotes a signal from the first field period of the second picture, $B_2$ a signal from the second field period of this picture, $A_3$ a signal from the first field period of the third picture and so forth.

The following Table shows the positions of the periodically operating switches 7, 75 and 77 for the relevant time intervals, s representing the position shown in FIG. 2 and n the position not shown.

interval $t_5-t_7$ and the signal $B_2$ in the time interval $t_9-t_{11}$ each at the input signal rate.

A signal which is delayed by one picture period with respect to the signal at the input 3 occurs at the picture memory output 47 of the change-over device 7. This signal includes plotted along the line 347 and is $A_1$ in the time interval $t_3-t_5$, $B_1$ in the time interval $t_5-t_7$, $A_2$ in the time interval $t_7-t_9$, $B_2$ in the time interval $t_9-t_{11}$ and $A_3$ in the time interval $t_{11}-t_{13}$.

A signal, which is plotted along the line 349 and which always has twice the rate of the signal at the input 3, appears at the output 49 of the change-over device 7. This signal is $A_1$ from $t_1$ to $t_2$, $A_1$ again from $t_2$ to $t_3$, $B_1$ from $t_3$ to $t_4$, $B_1$ again from $t_4$ to $t_5$, $A_2$ from $t_5$ to $t_6$, $A_2$ again from $t_6$ to $t_7$, $B_2$ from $t_7$ to $t_8$, $B_2$ again from $t_8$ to $t_9$, $A_3$ from $t_9$ to $t_{10}$, $A_3$ again from $t_{10}$ to $t_{11}$, $B_3$ from $t_{11}$ to $t_{12}$ and $B_3$ again from $t_{12}$ to $t_{13}$. So this signal has twice the field frequency with respect to the input signal. Also at the input of the third field memory 83 there appear only signals with at twice the rate. They are plotted along the line 381 and are successively $A_1$, $A_1$, $B_1$, $B_1$, $A_2$, $A_2$, $B_2$, $B_2$, $A_3$, $A_3$ and $B_3$ in the respective time intervals $t_2-t_3$, $t_3-t_4$, $t_4-t_5$, $t_5-t_6$, $t_6-t_7$, $t_7-t_8$, $t_8-t_9$, $t_9-t_{10}$, $t_{10}-t_{11}$, $t_{11}-t_{12}$ and $t_{12}-t_{13}$. The signal 381 appears with a delay of one field period at the output 85 of the third field memory 83. This is plotted along the line 385.

Finally, along the line 387 the signal at the output 87 of the change-over switch 77 is plotted which is alternately during the periods $t_2-t_4$, $t_6-t_8$ and $t_{10}-t_{12}$ the signal 349 and during the periods $t_4-t_6$, $t_8-t_{10}$ and $t_{12}-t_{13}$ the signal 385. This signal is a signal having twice the rate of the input signal but in which the fields of each picture have the same sequence as in the input signal.

The signal 381 is designated the field frequency-dou-

| | $t_0-t_1$ | $t_1-t_2$ | $t_2-t_3$ | $t_3-t_4$ | $t_4-t_5$ | $t_5-t_6$ | $t_6-t_7$ | $t_7-t_8$ | $t_8-t_9$ | $t_9-t_{10}$ | $t_{10}-t_{11}$ | $t_{11}-t_{12}$ | $t_{12}-t_{13}$ |
|---|---|---|---|---|---|---|---|---|---|---|---|---|---|
| 7 | s | n | n | s | s | n | n | s | s | n | n | s | s |
| 75 | | | s | n | s | n | s | n | s | n | s | n | s |
| 77 | | | s | s | n | n | s | s | n | n | s | s | n |

The following signals are applied to the input 3 of the change-over device 7: the signal $A_1$ in the time interval $t_0-t_1$, the signal $B_1$ in the time interval $t_1-t_3$, the signal $A_2$ in the time interval $t_3-t_5$, the signal $B_2$ in the time interval $t_5-t_7$, the signal $A_3$ in the time interval $t_7-t_9$, the signal $B_3$ in the time interval $t_9-t_{11}$ and the signal $A_4$ in the time interval $t_{11}-t_{13}$, which in FIG. 3 is plotted along the line 303.

As a result thereof, there appears at the output 25 of the first field memory 23 in the time intervals $t_1-t_2$ and $t_2-t_3$ the signal $A_1$ at twice the rate, in the time interval $t_3-t_5$ the signal $A_1$ at the same rate as in the time interval $t_0-t_1$ at the input 3, in the time intervals $t_5-t_6$ and $t_6-t_7$ the signal $A_2$ at twice the rate, in the time interval $t_7-t_9$ the signal $A_2$ at the same rate as at the input 3, in the time intervals $t_9-t_{10}$ and $t_{10}-t_{11}$ the signal $A_3$ at twice the rate and in the time interval $t_{11}-t_{13}$ the signal $A_3$ at the same rate as at the input 3. This is plotted in FIG. 3 along the line 325.

Along the line 331 of FIG. 3 there is shown the signal at the output 31 of the second field memory 29 which shows the signal $B_1$ in the time intervals $t_3-t_4$ and $t_4-t_5$, the signal $B_2$, in the time intervals $t_7-t_8$ and $t_8-t_9$, the signal $B_3$ and in the time intervals $t_{11}-t_{12}$ and $t_{12}-t_{13}$, each at twice the rate and the signal $B_3$ in the time bled signal and the signal 387 the picture frequency-doubled signal.

The signal at the output 89 of the change-over switch 79 may therefore, depending on the position of that switch, be of twice the field frequency or of twice the picture frequency.

Doubling the field frequency is required if movement occurs in the picture and doupling the picture frequency is required if there is no movement and a contour having a horizontal component is present in the picture; should there be no movement and no contour with a horizontal component then either the field or the picture-frequency doubling may be used.

The change-over switch 79 is now operated by the signal at its input 101 which is received from the movement detector 61 via the delay circuit 103, 105, 107 and adjusts the change-over switch 79 to the position shown at the occurrence of moving parts of the picture and to the position not shown in the case of stationary parts of the picture.

In the time intervals $t_5-t_7$, $t_9-t_{11}$, . . . a change-over action has no effect, as then the two contacts of the change-over switch 79 carry the same signal (381 and 387). In the time intervals $t_3-t_5$, $t_7-t_9$, $t_{11}-t_{13}$, . . . the change-over must be in correct synchronism with the signal at the change-over switch 79. These time intervals start, when there is no movement, with a B-signal (along the line 387) received from the output 31 of the second field memory 29. Therefore, the same signal path has been chosen for the movement detection signal as for the B-signal. The synchronization is then correct.

When the field frequency is doubled, so at the occurrence of movement, an interpolation may be employed in the output signal with a signal from the preceding line period of the output signal in order to prevent positional errors on display.

Instead of being switched only by a signal received from the movement detector 61, the change-over switch 79 may also be switched by, for example, a further signal which is received from a contour detector by means of which contours with a horizontal component are detected in the picture. At the occurrence of a stationary contour a change-over to picture frequency doubling is then effected. Then the third field memory 83 may be designed for the transmission of a smaller number of bits per video signal sample as on contours the quantization needs not be very accurate.

It will be obvious that the noise suppression and the operation of the change-over switch 79 may be done independent of each other, or may be omitted.

The signal received from the movement detector 61 for the control of the change-over switch 79 may, if so desired, be passed as an additional information bit through a suitably chosen signal path of the video signal.

What is claimed is:

1. A field frequency-doubling circuit for a television signal having an input for the television signal whose field frequency must be doubled, a first and a second field memory, respectively, a change-over device switching at half the field frequency for writing information into the first and the second field memory, respectively, at a predetermined rate and reading the second and the first field memory, respectively, at a rate of substantially twice the write rate, and an output for the field frequency-doubled television signal, characterized in that the change-over device comprises a portion for supplying to a picture memory output of the circuit a signal which has been alternately delayed two field periods by the first and the second field memory, respectively.

2. A field frequency-doubling circuit as claimed in claim 1, characterized in that it further comprises a combining circuit coupled to the picture memory output and the input for combining an input signal with a signal which has been delayed by two field periods.

3. A field frequency-doubling circuit as claimed in claim 2, characterized in that an output of the combining circuit is coupled to an input of the change-over device for alternately writing an output signal of the combining circuit into the first and the second field memory, respectively.

4. A field frequency-doubling circuit as claimed in any of the preceding claims, characterized in that, coupled to the output at which the signal having double the field frequency appears, there is a change-over device switching at the field frequency for writing, during half a field period of the input signal of the field-frequency doubling circuit, the field-frequency doubled signal into a third field memory and, during a subsequent half field period, for writing the third field memory output signal back into the third field memory, while, coupled to an output of the third field memory and the doubled-field-frequency output, there is a change-over device switching at half the field frequency, from an output of which a picture-frequency-doubled signal may be obtained.

5. A field frequency-doubling circuit as claimed in claim 1, having a combining circuit coupled to the picture memory output and the input, characterized in that a change-over switch is coupled to a doubled-field frequency output and the doubled-picture frequency output, from an output of which a television signal can be obtained whose field-frequency or picture frequency has been doubled depending on the position of the change-over switch.

6. A field frequency-doubling circuit as claimed in claim 5, characterized in that a control signal input of the last-mentioned change-over switch is coupled to an output of the combining circuit.

* * * * *